(12) United States Patent
Choi

(10) Patent No.: US 12,418,971 B2
(45) Date of Patent: Sep. 16, 2025

(54) SYSTEM AND METHOD FOR DIRECTING PERFORMANCE

(71) Applicant: Ji Sun Choi, Seoul (KR)

(72) Inventor: Ji Sun Choi, Seoul (KR)

( * ) Notice: Subject to any disclaimer, the term of this patent is extended or adjusted under 35 U.S.C. 154(b) by 110 days.

(21) Appl. No.: 18/407,145

(22) Filed: Jan. 8, 2024

(65) Prior Publication Data

US 2024/0155757 A1 May 9, 2024

Related U.S. Application Data

(63) Continuation of application No. 17/561,359, filed on Dec. 23, 2021, now Pat. No. 11,930,579, which is a continuation of application No. PCT/KR2020/007585, filed on Jun. 11, 2020.

(30) Foreign Application Priority Data

Jun. 24, 2019 (KR) ........................ 10-2020-0048287

(51) Int. Cl.
*H05B 47/19* (2020.01)
*A63J 5/02* (2006.01)
*H05B 47/155* (2020.01)

(52) U.S. Cl.
CPC ................ *H05B 47/19* (2020.01); *A63J 5/02* (2013.01); *H05B 47/155* (2020.01)

(58) Field of Classification Search
CPC .......... H05B 47/155; H05B 47/19; A63J 5/02; A63J 5/10
See application file for complete search history.

(56) References Cited

U.S. PATENT DOCUMENTS

| | | | |
|---|---|---|---|
| 10,762,315 B2 | 9/2020 | Lee et al. | |
| 11,638,338 B2 | 4/2023 | Choi et al. | |
| 11,647,297 B2 | 5/2023 | Song et al. | |
| 2006/0022214 A1* | 2/2006 | Morgan | H05B 45/40 257/E25.032 |
| 2017/0249489 A1 | 8/2017 | Lee et al. | |
| 2018/0049287 A1 | 2/2018 | Lu et al. | |
| 2018/0080618 A1 | 3/2018 | Song | |

(Continued)

FOREIGN PATENT DOCUMENTS

| | | |
|---|---|---|
| JP | 2015-011981 A | 1/2015 |
| KR | 10-2000-0012267 A | 3/2000 |

(Continued)

OTHER PUBLICATIONS

International Search Report issued in PCT/KR2020/007585; mailed Oct. 27, 2020.

(Continued)

*Primary Examiner* — Monica C King
(74) *Attorney, Agent, or Firm* — Studebaker Brackett PLLC

(57) ABSTRACT

Disclosed is a performance directing system that simultaneously controls cheering lighting devices of audiences by linking a performance hall and a remote place. According to an embodiment of the inventive concept, it is possible to identically implement and provide performance directing effects on audience seats of a performance hall to audiences at a remote place. Accordingly, audiences at the remote place may have the same experience as watching a performance at an actual performance site.

20 Claims, 9 Drawing Sheets

(56) References Cited

U.S. PATENT DOCUMENTS

| | | |
|---|---|---|
| 2021/0136272 A1 | 5/2021 | Song et al. |
| 2022/0264727 A1 | 8/2022 | Choi et al. |
| 2022/0400545 A1* | 12/2022 | Kim .................... H05B 47/198 |
| 2023/0117158 A1 | 4/2023 | Choi |

FOREIGN PATENT DOCUMENTS

| | | |
|---|---|---|
| KR | 10-0939476 B1 | 1/2010 |
| KR | 10-2018-0015703 A | 2/2018 |
| KR | 10-2018-0016455 A | 2/2018 |
| KR | 10-2019-0070220 A | 6/2019 |
| KR | 10-2020-0050448 A | 5/2020 |

OTHER PUBLICATIONS

Office Action issued in KR 10-2021-0054090; mailed by the Korean Intellectual Patent Office on Aug. 5, 2021.

* cited by examiner

SYSTEM AND METHOD FOR DIRECTING PERFORMANCE

CROSS-REFERENCE TO RELATED APPLICATIONS

The present application is a continuation of U.S. patent application Ser. No. 17/561,359, filed on Dec. 23, 2021, which is a continuation of International Patent Application No. PCT/KR2020/007585, filed on Jun. 11, 2020, which is based upon and claims the benefit of priority to Korean Patent Application No. 10-2020-0048287 filed on Jun. 24, 2019. The disclosures of the above-listed applications are hereby incorporated by reference herein in their entirety.

BACKGROUND

Embodiments of the inventive concept described herein relate to a performance directing system, and more particularly, relate to a performance directing system that simultaneously controls cheering lighting devices of audiences by linking a performance hall and a remote place.

In general, a lighting device refers to a light emitting device that achieves the purpose of lighting by reflecting, refracting, and transmitting light from a light source. Lighting devices may be classified into an indirect lighting device, a semi-indirect lighting device, a full-diffusion lighting device, a semi-direct lighting device, and a direct lighting device depending on light distribution.

With developments of technologies, the lighting devices are being used for various purposes. For example, the lighting devices are used to create a media facade. The media facade refers to the implementation of media functions by installing lighting devices on exterior walls of a building.

As another example, the lighting devices are sometimes used as small cheering tools in a sports stadium or concert hall in an environment under a specific level of illumination. However, because a plurality of lighting devices are individually controlled in such the environment, it is difficult to create a systematic lighting pattern or shape. Moreover, it is not easy to achieve expected cheering effects by using only light sources positioned in a lighting device.

Accordingly, to specifically solve the above problems, there is a need for a method capable of collectively controlling a plurality of lighting devices and directing various performances in a performance hall such as a sports stadium or concert hall through this control.

Besides, there is a need for a method that allows audiences, who fail to attend a performance hall, as well as audiences at an actual performance place to feel the same experience as in the actual performance by providing various performance effects demonstrated in the performance hall to audiences in a place (i.e., a remote place) other than the performance hall. In particular, even at a remote place, it is necessary to provide an environment, such as creating a cheering effect by using a cheering tool while audiences at the remote place watch performance on audience seats in the performance hall, by controlling cheering tools possessed by the audiences at the remote place in conjunction with the cheering tool in the performance hall.

SUMMARY

Embodiments of the inventive concept provide a method and system for directing performance that may simultaneously control cheering lighting devices of audiences by linking a performance hall and a remote place.

Embodiments of the inventive concept provide a method and system for directing performance that may control performance effects implemented by using cheering lighting devices on audience seats in the performance hall in conjunction with cheering lighting devices possessed by audiences at the remote place.

Embodiments of the inventive concept provide a method and system for directing performance that may allow the control console device controlling cheering lighting devices in the performance hall to control cheering lighting devices at the remote place together.

Embodiments of the inventive concept provide a method and system for directing performance that may provide synchronized control data, which is used to direct a performance directing effect by synchronizing cheering lighting devices in the performance hall with cheering lighting devices at the remote place, by using control data generated to control the cheering lighting devices in the performance hall.

Embodiments of the inventive concept provide a method and system for directing performance that may control the cheering lighting devices of audiences at the remote place by linking the performance data of the performance hall with the performance data of the remote place by using physical storage media.

Embodiments of the inventive concept provide a method and system for directing performance that may match performance data and cheering lighting devices by synchronizing the performance data with the cheering lighting devices by using time code information in the case where there is a playback delay when a video or audio is played.

Embodiments of the inventive concept provide a method and system for directing performance that may control cheering lighting devices at the remote place as the smart device simultaneously controls the performance data and control data generated to control the cheering lighting devices of the performance hall for the performance data.

Problems to be solved by the inventive concept are not limited to the problems mentioned above, and other problems not mentioned will be clearly understood by those skilled in the art from the following description.

According to an embodiment, a performance directing system for simultaneously controlling cheering lighting devices of audiences by linking a performance hall and a remote place includes a control console device generating control data for controlling first cheering lighting devices in response to performance direction data based on the performance direction data generated to implement a performance directing effect by using the first cheering lighting devices positioned to correspond to each seat in the performance hall, a data processing device providing performance data generated based on a performance demonstrated in the performance hall to audiences at the remote place to implement a performance directing effect at the remote place in conjunction with the performance directing effect implemented in the performance hall and separately processing the performance data and the control data synchronized with the performance data, and second cheering lighting devices controlled to correspond to the performance direction data based on the control data corresponding to a current playback section of the performance data. The second cheering lighting devices are possessed by the audiences at the remote place. The second cheering lighting devices are controlled based on the control data the same as the first cheering lighting devices.

In an embodiment of the inventive concept, the data processing device may include a performance data processing device receiving and processing the performance data and a control data processing device receiving and processing the control data.

In an embodiment of the inventive concept, the second cheering lighting devices may be controlled based on the control data the same as at least one of the first cheering lighting devices.

In an embodiment of the inventive concept, the second cheering lighting devices may correspond to virtual seats virtually generated in the performance hall and may be controlled based on the control data.

In an embodiment of the inventive concept, the control data synchronized with the performance data may be configured by mapping time code information onto the control data so as to be synchronized with the performance data by using the time code information.

In an embodiment of the inventive concept, the control data processing device may extract control data mapped onto time code information corresponding to a current playback section of the performance data from the control data synchronized with the performance data and may provide the second cheering lighting devices with the extracted control data.

In an embodiment of the inventive concept, the control data may be generated such that the control console device controls the first cheering lighting devices in response to the performance direction data.

In an embodiment of the inventive concept, the system may further include a server receiving the control data from the console device and transmitting the control data to the control data processing device.

In an embodiment of the inventive concept, the system may further include a master device that receives the control data from the control console device, converts the control data into a wireless signal, and transmits the wireless signal to the first cheering lighting devices in the performance hall through wireless communication.

In an embodiment of the inventive concept, the performance data may be one of a video, an audio, an image, and a text.

In an embodiment of the inventive concept, the performance data and the control data may be provided by using a physical storage medium.

According to an embodiment, a method of controlling a performance directing system that simultaneously controls cheering lighting devices of audiences by linking a performance hall and a remote place includes generating, by a control console device of the performance directing system, control data for controlling first cheering lighting devices in response to performance directing data based on the performance directing data generated to implement a performance directing effect by using the first cheering lighting devices positioned at each seat in the performance hall, and providing, by a data processing device of the performance directing system, performance data generated based on a performance demonstrated in the performance hall to audiences at the remote place to implement a performance directing effect at the remote place in conjunction with the performance directing effect implemented in the performance hall and separately processing the performance data and the control data synchronized with the performance data. Second cheering lighting devices of the performance directing system are controlled to correspond to the performance direction data based on the control data corresponding to a current playback section of the performance data, possessed by the audiences at the remote place, and controlled based on the control data the same as the first cheering lighting devices.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
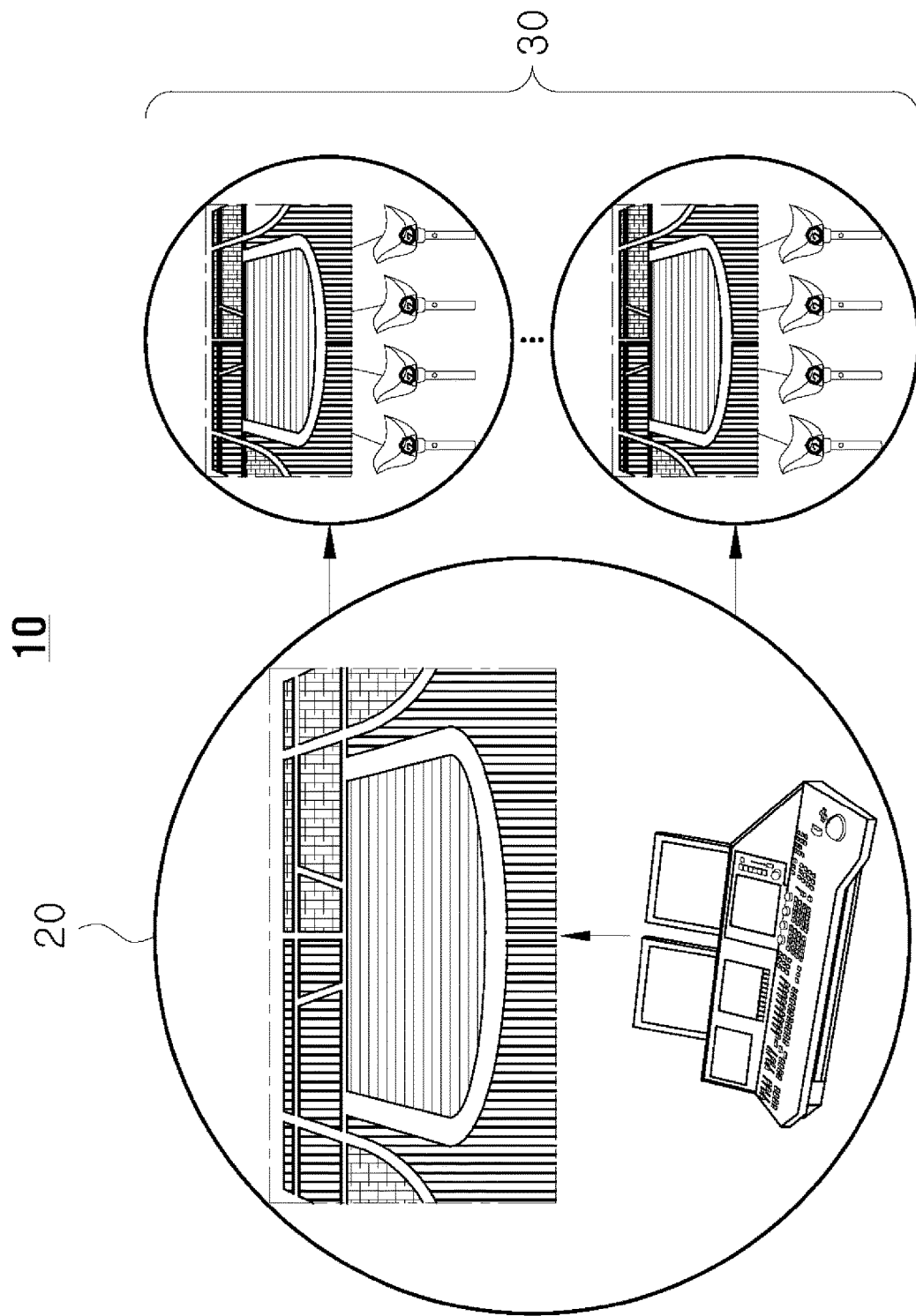
FIGS. 1 and 2 are diagrams schematically illustrating a configuration of a performance directing system that simultaneously controls cheering lighting devices of audiences by linking a performance hall and a remote place, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The term "unit" or "module" used herein may refer to software or hardware such as field programmable gate array (FPGA) or application specific integrated circuit (ASIC), and the "unit" or "module" may perform some functions. However, the "unit" or "module" may be not limited to software or hardware. The "unit" or "module" may be configured to exist in an addressable storage medium or may be configured to operate one or more processors. Accordingly, as an example, "units" or "module" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" or "modules" and components may be combined into a smaller number of "units" or "modules" and components or may be divided into additional "units" or "modules" and components.

Hereinafter, an embodiment of the inventive concept will be described in detail with reference to the accompanying drawings.

Figure 2:
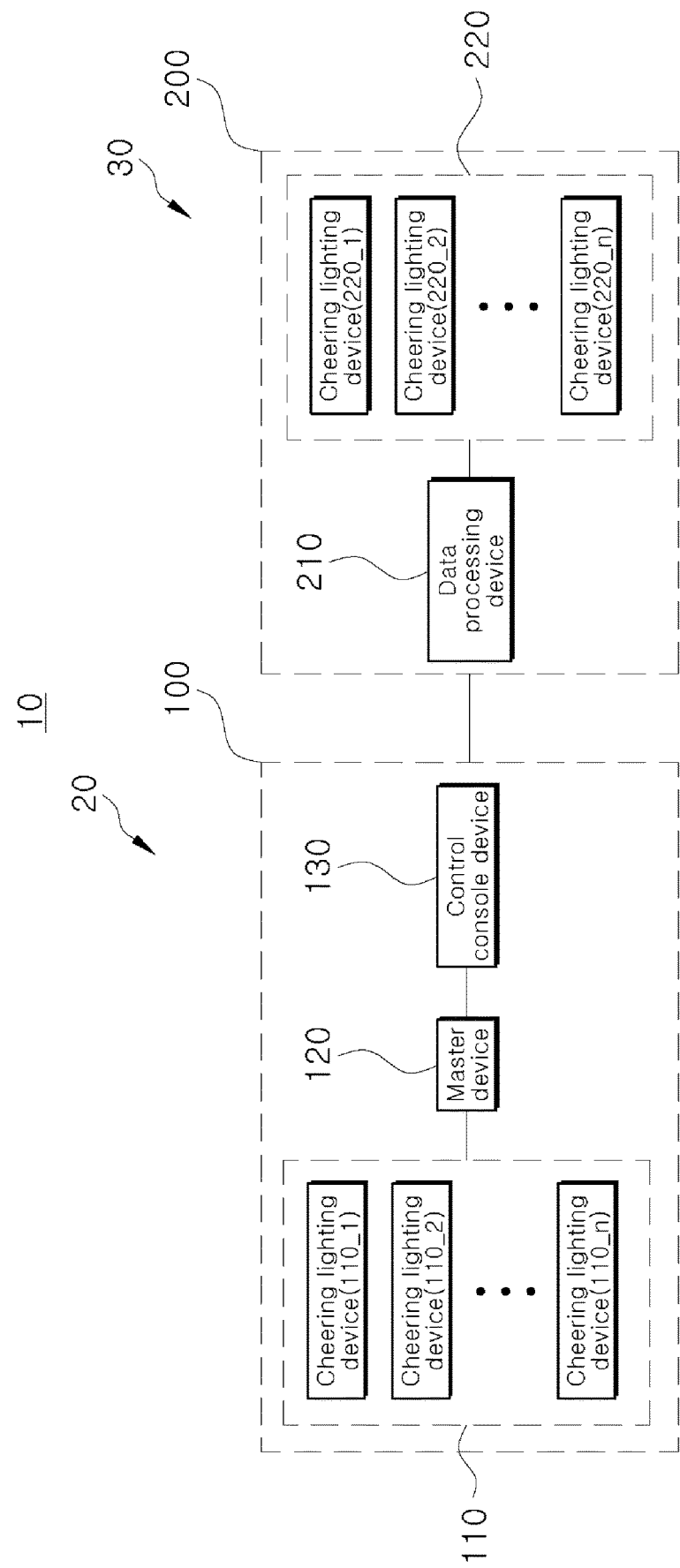

FIGS. 1 and 2 are diagrams schematically illustrating a configuration of a performance directing system that simultaneously controls cheering lighting devices of audiences by linking a performance hall and a remote place, according to an embodiment of the inventive concept.

Referring to FIGS. 1 and 2, according to an embodiment of the inventive concept, a performance directing system 10 may be implemented to simultaneously control cheering lighting devices (110, 220) possessed by audiences by linking a performance hall 20 and at least one remote place 30.

The performance hall 20 may refer to a performance hall such as a sports stadium or concert hall, and may mean a place where performances such as actual sports events or concerts are demonstrated.

Audiences that desire to watch an actual performance may enter the performance hall 20 with their cheering lighting devices (110_1, . . . , 110_n) and may take their seats in the performance hall 20.

The remote place 30 may refer to a place other than the performance hall 20, and may be a place, in which the same performance effect as the performance effect in the performance hall 20 is implemented, other than the performance hall 20 where the actual performance is being demonstrated. For example, the remote place 30 may be a public place where a large number of people gather, such as a theater, or a private space such as a house or a small space. At this time, it is preferable that performance data identical to that of the actual performance demonstrated in the performance hall 20 is transmitted from the performance hall 20 to the remote place 30 in real time. However, an embodiment is not limited thereto. For example, actual performance data of the performance hall 20 may be identified at the remote place 30 through a physical storage medium (not illustrated) such as various flash memories, for example, a secure digital (SD) memory card, a memory stick, or a multi-media card (MMC) in addition to various recording media such as CD, DVD, HD-DVD, and Bluray DISC. Moreover, the performance data may be identified at the remote place 30 through an online video providing service such as YouTube.

Here, the performance data may mean one of performance demonstration data. The performance demonstration data may include all types of data associated with performance demonstration, for example, one of a video, audio, image, and text. In detail, the performance demonstration data may include a performance demonstration video, a performance demonstration audio, a performance demonstration image, a performance demonstration text, and the like. Hereinafter, the content of the inventive concept is described assuming that the performance demonstration data is performance data. However, it is not limited thereto. For example, a configuration used as performance data may mean all types of performance demonstration data.

In the remote place 30, audiences who desire the same performance scene and performance directing effects as those in the actual performance demonstrated in the performance hall 20 may have their own cheering lighting devices (220_1, . . . , 220_n).

That is, according to an embodiment of the inventive concept, the performance directing system 10 may simultaneously control cheering lighting devices 110 of audiences in the performance hall 20 and cheering lighting devices 220 of audiences at the remote place 30 by linking the cheering lighting devices 110 and the cheering lighting devices 220.

In detail, the performance directing system 10 may include a performance-hall-side control system 100 consisting of the cheering lighting devices (110_1, . . . , 110_n), a master device 120, and a control console device 130 in the performance hall 20. Also, the performance directing system 10 may include a remote-place-side control system 200 consisting of a data processing device 210 and cheering lighting devices (220_1, . . . , 220_n) at the remote place 30.

Here, for convenience of description, the performance-hall-side control system 100 is referred to as the "first control system" 100. The remote-place-side control system 200 is be referred to as the "second control system" 200. Besides, the cheering lighting devices 110 in the performance hall 20 are referred to as the "first cheering lighting devices" 110. The cheering lighting devices 220 at the remote place 30 are referred to as the "second cheering lighting devices" 220.

The control console device 130 may control emission states (e.g., a luminous color, a brightness value, a blinking speed, or the like) of the first cheering lighting devices 110, and thus the first control system 100 may implement various types of performance directing effects (e.g., a specific text, a specific image, surfing, and the like) on audience seats of the performance hall 20.

As the control console device 130 controls the first cheering lighting devices 110, the second control system 200 may also control the second cheering lighting devices 220 in conjunction with the first cheering lighting devices 110. In an embodiment, the second control system 200 may implement various types of performance directing effects at the remote place 30 by controlling emission states of the second cheering lighting devices 220 possessed by audiences at the remote place 30 under the control of the control console device 130.

Under the control of the control console device 130, the first cheering lighting devices 110 may perform a function to direct various types of performance directing effects in real time or depending on predetermined control information. In an embodiment, the first cheering lighting devices 110 may refer to devices including light sources, and may be small cheering tools used in a performance hall such as a sports stadium or concert hall.

The master device 120 may communicate with the first cheering lighting devices 110 in various manners and then may deliver various pieces of control information, which are received from the control console device 130, to the first cheering lighting devices 110.

In an embodiment, the master device 120 may receive control data generated by the control console device 130 and may convert the control data into a wireless signal. Moreover, the master device 120 may broadcast the converted wireless signal to the first cheering lighting devices 110 in the performance hall 20 by using wireless communication (e.g., RF communication or the like). Here, the wireless signal may be generated by converting the control data into a signal in a form for controlling the first cheering lighting devices 110 in a wireless communication method.

According to an embodiment, the master device 120 may be omitted. The control console device 130 may directly transmit the control data to the first cheering lighting devices 110 through wired or wireless communication.

To implement various performance directing effects in the performance hall 20, the control console device 130 may perform a function to control the first cheering lighting devices 110. At the same time, to implement the same performance directing effect as a performance directing effect in the performance hall 20 even at the remote place 30, the control console device 130 may perform a function to control the second cheering lighting devices 220.

In an embodiment, the control console device 130 may be an electronic device such as a smartphone, a tablet PC, a desktop PC, laptop PC, a netbook computer, or the like. Alternatively, the control console device 130 may include a part of configurations of the electronic device or may be configured in various forms capable of interworking with the part of the configurations.

In another embodiment, the control console device 130 may be a control device used at a performance site and may be a broadcasting-and-performance-specific console device that controls a lighting device, a special effect device, and the like at the performance site. For example, the control console device 130 may be a console device that controls various devices at a performance site by using a lighting control protocol.

The control console device 130 may generate control data for controlling the first cheering lighting devices 110 based on performance direction data generated to implement the performance directing effect by using the first cheering lighting devices 110 positioned to correspond to each seat in the performance hall 20 so as to correspond to the performance direction data.

Furthermore, the control console device 130 may control the first cheering lighting devices 110 and the second cheering lighting devices 220 together by providing control data used to control the first cheering lighting devices 110 to the second cheering lighting devices 220 of the remote place 30.

To implement the performance directing effect at the remote place 30 in conjunction with the performance directing effect implemented in the performance hall 20, the data processing device 210 may process the performance data, which is generated based on the performance demonstrated in the performance hall 20 to the audiences of the remote place 30, and control data generated by the control console device 130 together. That is, the data processing device 210 may simultaneously control the performance data and the control data. While providing the performance data to the remote place 30, the data processing device 210 may simultaneously control the second cheering lighting devices 220 of audiences at the remote place 30. As the data processing device 210 simultaneously controls performance data and control data, the data processing device 210 may control the second cheering lighting devices 220 while preventing playback errors or playback delays that may occur while the performance data is played.

As such, the data processing device 210 may be a smart device, which is carried by an individual and which includes a video playback function and a remote communication function, for example, a smartphone, a tablet PC, a wearable device, a desktop PC, a laptop PC, a netbook computer, a head mounted display (HMD), a personal digital assistant (PAD), a virtual reality (VR) device, a smart car; alternatively, the data processing device 210 may include a part of configurations of the smart device or may be configured in various forms capable of interworking with the part of the configurations.

For example, when the data processing device 210 corresponds to a smart phone among smart devices, the data processing device 210 may analyze and identify control data by using an application program (or an application) and may transmit and control the control data to the second cheering lighting devices 220 of audiences at the remote place 30 in a wired/wireless communication method while playing performance data on a screen of the smartphone. At this time, the application program (or application) may be downloaded through an external server or the performance-hall-side control system 100 through wireless communication.

As such, the data processing device 210 may control the second cheering lighting devices 220 at the remote place 30 individually or simultaneously. For example, when the remote place 30 is a public place where a plurality of audiences are positioned, the plurality of data processing devices 210 may individually control the plurality of second cheering lighting devices 220. On the other hand, when the remote place 30 is a public place where a plurality of audiences are positioned, the plurality of second cheering lighting devices 220 may be simultaneously controlled by using the single data processing device 210. That is, the second cheering lighting devices 220 may be controlled by analyzing and identifying the control data while the performance data is played through a playback device (not shown) (e.g., a beam projector, a monitor, a TV, or the like) connected to the data processing device 210. Accordingly, while the performance data is shared through the playback device, the audiences at the remote place 30 may experience a performance by using the second cheering lighting devices 220.

Furthermore, when the remote place 30 is a place in a private space, the data processing device 210 may individually control the cheering lighting device 220. At this time, while playing the performance data through the playback device, the data processing device 210 may control the cheering lighting devices 220 by analyzing and checking the control data.

In the meantime, the control data may be provided in synchronization with the performance data and may be control data synchronized to correspond to a current playback section of the performance data.

In an embodiment, the control data synchronized with the performance data may be configured by mapping time code information onto the control data so as to be synchronized with the performance data by using time code information generated based on the performance data or time code information generated based on the performance of the performance hall 20. That is, the performance data of the remote place 30 may be synchronized with the second cheering lighting devices 220 of the remote place 30 by using the time code information. Accordingly, according to an embodiment of the inventive concept, it is described that time code information is generated based on the performance data or the performance of the performance hall 20, but is not limited thereto. For example, the time code information mapped to the control data synchronized to correspond to a current playback section of the performance data may be generated by the master device 120, the control console device 130, the first cheering lighting devices 110, or a server 140 to be described later. In other words, because the time code information is included in the control data corresponding to the performance data of the performance hall 20 to be broadcast to the remote place 30, the time code information may be shared and controlled by various devices positioned at the remote place 30 capable of controlling the control data.

In addition, to solve playback delays caused by intentional delayed relay broadcasting or technical limitations of long-distance transmission at a remote place, when the performance data is delivered to the remote place 30, the control data provided to the first cheering lighting devices 110 is transmitted together or separately depending on the performance data in the performance hall 20. When the performance data at the remote place 30 is played by including the time code information in the control data, the control data and performance data of the second cheering lighting devices 220 may be synchronized with each other by mapping the time code information included in the performance data onto the control data. Accordingly, audiences at the remote place 30 may enjoy more realistic performance by matching the performance data with the second cheering lighting devices 220. Besides, when the actual performance data is played through physical storage media such as CD, DVD, HD-DVD, Bluray DISC, or the like or through an online video providing service such as YouTube, or the like, the sense of immersion may be maximized by matching the performance data played by using the time code information with the control data of the cheering lighting device.

At this time, the data processing device 210 may extract the control data mapped onto the time code information corresponding to the current playback section of the performance data from the control data synchronized with the performance data and then may provide the extracted control data to the second cheering lighting devices 220.

Moreover, the data processing device 210 may receive the corresponding performance data and control data according to the performance data through an online video providing service such as YouTube.

Also, the data processing device 210 may include a display device capable of outputting the performance data.

In the meantime, the data processing device 210 may receive and process the performance data and the control data according to the performance data through a physical storage medium. The data processing device 210 may receive the performance data and the control data according to the performance data through a physical storage medium including various flash memories, for example, a secure digital (SD) memory card, a memory stick, or a multi-media card (MMC) in addition to various recording media such as CD, DVD, HD-DVD, and Bluray DISC. As such, when performance data is identified at a remote place by using a physical storage medium, audiences at the remote place may have the same experience as watching a performance in a performance hall, regardless of time and place.

The second cheering lighting devices 220 may perform a function to direct various types of performance directing effects in real time so as to corresponding to the first cheering lighting devices 110, which are controlled under the control of the control console device 130, or in synchronization with the first cheering lighting devices 110 based on the control data. At this time, the second cheering lighting devices 220 may be controlled based on the same control data as the first cheering lighting devices 110.

In an embodiment, the second cheering lighting devices 220 may refer to devices including light sources, and may be small cheering tools used in a performance hall such as a sports stadium or concert hall. Alternatively, the second cheering lighting devices 220 may utilize various smart devices capable of performing a function such as that of a small cheering tool.

In an embodiment, the second cheering lighting devices 220 may be controlled to correspond to performance direction data based on the control data corresponding to a current playback section of the performance data. At this time, the second cheering lighting devices 220 may receive control data from the data processing device 210. However, an embodiment is not limited thereto. For example, the control data may also be received through other devices connected to the second cheering lighting devices 220.

Furthermore, the second cheering lighting devices 220 may correspond to at least one of the first cheering lighting devices 110 so as to be controlled based on the control data. Alternatively, the second cheering lighting devices 220 may correspond to virtual seats, which are created virtually in the performance hall 20, so as to be controlled based on the control data.

Hereinafter, according to an embodiment of the inventive concept having such a structure, a method of simultaneously controlling cheering lighting devices of audiences by linking a performance hall and a remote place, and the performance directing system 10 performing the method will be described in more detail. At this time, the performance directing system 10 may be implemented to simultaneously control the cheering lighting devices (110, 220) carried by audiences by linking the performance hall 20 and at least one remote place 30 through the data processing device 210, which provides control data according to performance data while providing performance data.

Figure 3:
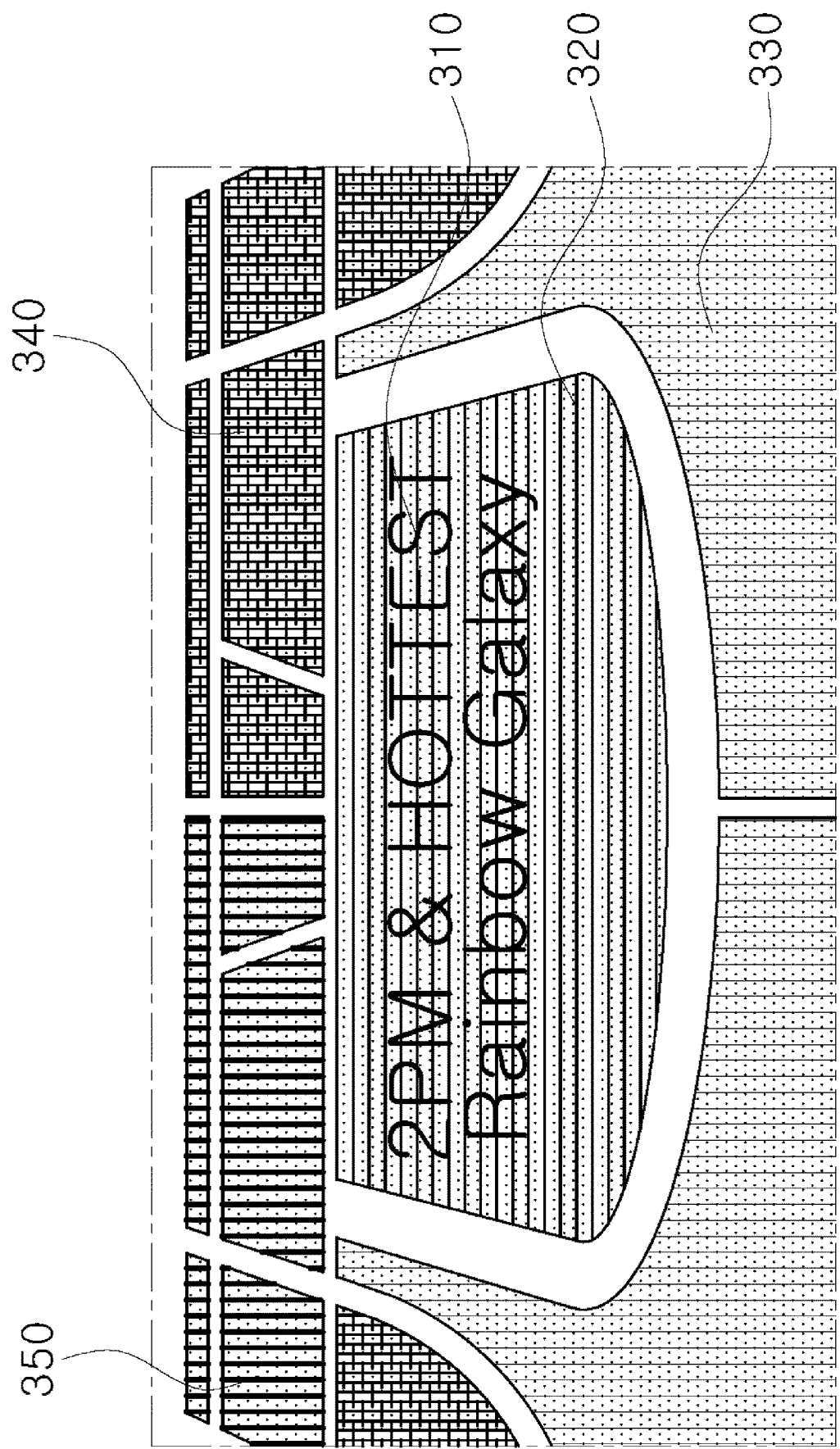
FIG. 3 is a diagram illustrating an example of performance directing effects directed on audience seats of a performance hall, according to an embodiment of the inventive concept.

FIG. 3 is a diagram illustrating an example of performance directing effects directed on audience seats of the performance hall 20, according to an embodiment of the inventive concept.

To implement performance directing effects by using the first cheering lighting devices 110 positioned to correspond to each seat in the performance hall 20, the performance directing system 10 may generate performance direction data.

At this time, the performance direction data may be generated by the control console device 130 and may be generated by a separate device (e.g., a data generation device) and provided to the control console device 130. For convenience of description, it will be described below that the data generating device (not illustrated) generates the performance direction data.

The data generation device may generate a direction scene to be directed by using the first cheering lighting devices 110 during a performance time in the performance hall 20. At this time, the data generation device may organize a direction scene for each performance direction section depending on the direction scene. For example, a first direction scene (e.g., a first scene) may be generated in a first performance direction section (e.g., a first time). A second direction scene (e.g., a second scene) may be generated in a second performance direction section (e.g., a second time). As illustrated in FIG. 3, when audience seats in the performance hall 20 are organized, a first direction scene displayed with a different emission color for each audience seat may be generated in the first performance direction section together with a specific text as in FIG. 3. Moreover, a second direction, which is different from the first direction scene, such as a specific figure or pattern may be generated in the second performance direction section.

The data generation device may group audience seats in the performance hall 20 into a plurality of groups based on each direction scene generated for each performance direction section and then may generate group information about the plurality of groups. For example, when there are a plurality of group units that may be grouped in a similar or identical light emission shape in the first direction scene to be directed in the first performance direction section, the data generation device may divide audience seats in the performance hall into a plurality of areas so as to correspond to a group unit and may generate the divided areas as each group. In other words, the first direction scene of the first performance direction section may include the plurality of groups.

Referring to FIG. 3, the data generation device may designate audience seats marked with a specific text to a first group 310, may identify seats to be directed in the same luminous color within the audience seats, and may designate the seats to second to fifth groups 320, 330, 340, and 350.

The data generation device may map pieces of group information generated for each performance direction section (a performance direction scene) onto information about audience seats and then may generate the mapped information as performance direction data for each performance direction section. For example, as shown in Table 1 below, the data generation device may organize performance direction data obtained by mapping the pieces of group information corresponding to the directing information for each section. Here, the group information means group-specific control information for controlling the first cheering lighting devices 110 for each group so as to correspond to each direction scene for each performance direction section. The group-specific control information may include group allocation information (i.e., group identification information) and emission state information set to correspond to the group allocation information. That is, the first cheering lighting devices 110 having the same group allocation information for each performance direction section may include the same emission state information. Moreover, the first cheering lighting devices 110 having the same group allocation information may be different for each performance direction section. For example, in the first performance direction section (a first performance direction scene), the cheering lighting device 110_1 having 'A' group allocation information may be set to 13' group allocation information in the second performance direction section (a second performance direction scene). In other words, the cheering lighting device 110 belonging to group A in the first performance direction section (the first performance direction scene) may be different from the cheering lighting devices 110 belonging to group A in the second performance direction section (the second performance direction scene).

TABLE 1

|  |  | Direction information (e.g., scene information) | | | |
|---|---|---|---|---|---|
|  |  | First direction information | | Second direction information | |
| Group information | Group-specific emission state information | A<br>B<br>C<br>D<br>E | (255, 255, 0)<br>(154, 112, 55)<br>(0, 0 , 255)<br>(0, 255, 255)<br>(100, 100, 100) | A<br>B<br>C | (0, 0, 0)<br>(255, 0, 0)<br>(0, 0, 255) |

As described above, the control console device 130 may control the first cheering lighting devices 110 positioned to correspond to each seat in the performance hall 20 by using the performance direction data and may generate control data for such the control.

In an embodiment, the control console device 130 may generate control data including emission state information for each group mapped onto a direction scene to be directed in the corresponding performance direction section based on the performance direction data and then may broadcast the generated control data through wireless communication. At this time, the control console device 130 may directly transmit control data to the first cheering lighting devices 110 in the performance hall 20 and may transmit the control data to the first cheering lighting devices 110 in the performance hall 20 through the master device 120. In addition, the control data may be transmitted through an antenna (not shown) for wireless transmission connected to the master device 120 by wire or wirelessly. In this case, as described above, the master device 120 may receive control data generated by the control console device 130 and then may convert the control data received by the master device 120 into a data format determined depending on the communication method. Accordingly, the master device 120 may transmit the converted control data to the first cheering lighting devices 110 depending on a specific communication method (e.g., wireless communication such as RF communication).

For example, for the first performance direction section (e.g., the first time) in a process of demonstrating a performance in a performance hall, the control console device 130 may obtain pieces of group information mapped onto the first direction scene of the first performance direction section (e.g., first time). According to Table 1, five groups (A, B, C, D, E) are mapped onto the first direction information. The emission state information (e.g., RGB information) corresponding thereto is set for each of the groups (A, B, C, D, E) The control console device 130 may generate control data for 5 pieces of group information including each group mapped onto the first performance direction section and emission state information corresponding thereto.

Besides, the control console device 130 may implement (a part of) a performance direction scene as shown in FIG. 3 even at the remote place 30 by providing control data generated to correspond to the performance direction data to the second cheering lighting devices 220 of the remote place 30 in conjunction with the performance hall 20.

In the meantime, the first and second cheering lighting devices (110, 220) may be in a form of luminescent cheering sticks or body-attached type devices, which are possessed by audiences and which participate as a part of a performance direction. The first and second cheering lighting devices (110, 220) are mapped onto audience seats one to one so as to serve a role of displaying an audience seat or an image such as an electric billboard or a media facade in a dark or equivalent condition of the performance hall.

At this time, the second cheering lighting devices 220 may correspond to at least one of the first cheering lighting devices 110 so as to be identically controlled based on the control data. Alternatively, the second cheering lighting devices 220 may correspond to virtual seats, which are created virtually in the performance hall 20, so as to be controlled based on the control data.

In an embodiment, the first and second cheering lighting devices (110, 220) may store performance direction data for utilizing the first and second cheering lighting devices (110, 220) in the audience seat in advance before performance direction.

In another embodiment, the first and second cheering lighting devices (110, 220) may store only group information about a group, to which each of the first and second cheering lighting devices (110, 220) belongs, for each scene in advance before performance direction. In this case, the emission state information (e.g., color information) may be excluded from the pre-stored information. The group information may refer to a group of cheering lighting devices controlled with the same color at a specific moment or scene. To this end, the first and second cheering lighting devices 110 and 220 may maintain the allocated group-specific emission state information (e.g., lighting color information) as empty data, or may store only dummy data or temporary color information. That is, the actual group-specific lighting color information may be transmitted in real time while the actual performance is demonstrated.

That is, the group information may be allocated such that a plurality of cheering lighting devices controlled with the same color at a particular scene have the same group information. Information about color in which the corresponding group is controlled may be excluded. Unlike a method of storing all color information in a cheering device, the color may be changed in consideration of the atmosphere or situation of a site in a process of directing the actual performance, and thus the performance may be directed flexibly.

Figure 4:
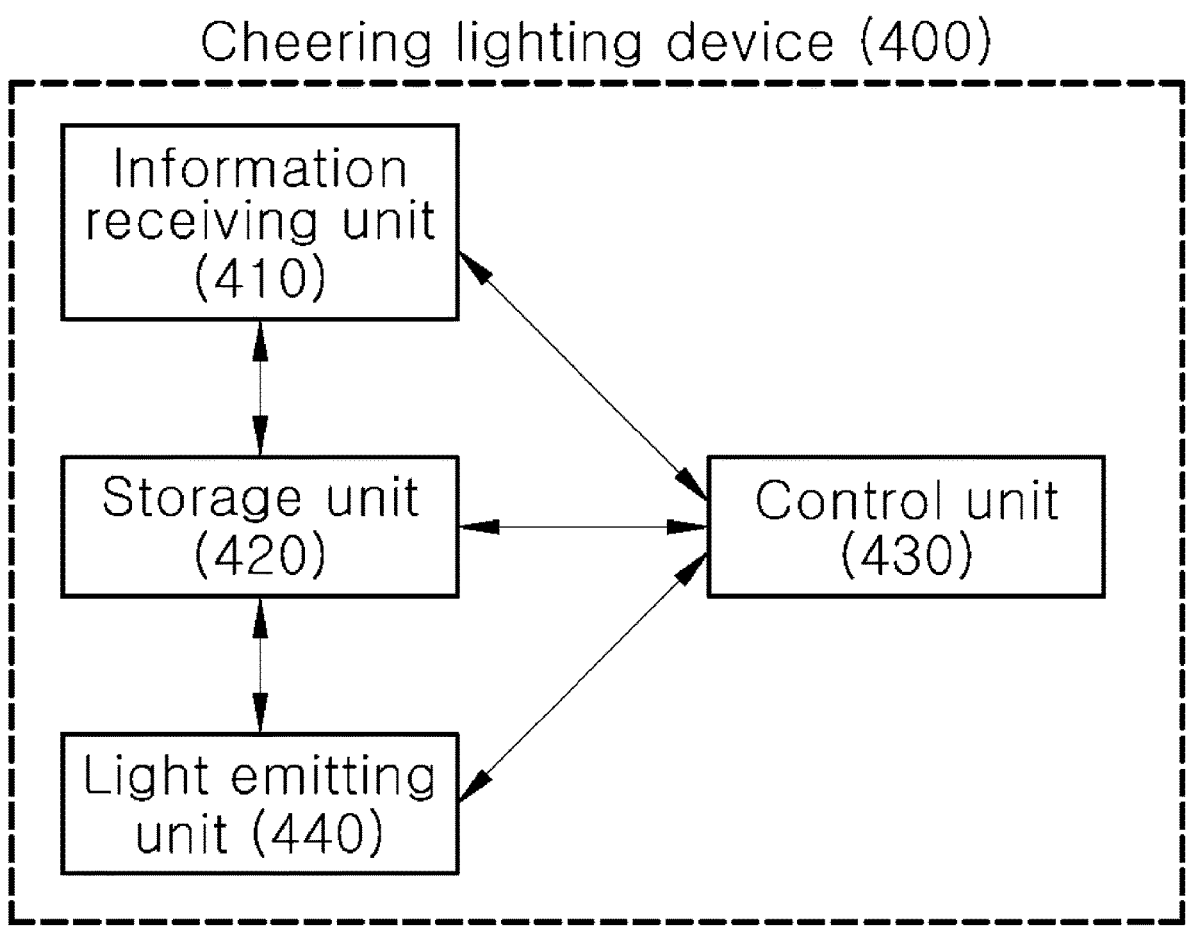
FIG. 4 is a block diagram illustrating a configuration of a cheering lighting device, according to an embodiment of the inventive concept.

FIG. 4 is a block diagram illustrating a configuration of a cheering lighting device, according to an embodiment of the inventive concept. The cheering lighting device of FIG. 4 is a diagram illustrating one of the first cheering lighting devices 110 and the second cheering lighting devices 220.

Referring to FIG. 4, according to an embodiment of the inventive concept, a cheering lighting device 400 may include an information receiving unit 410, a storage unit 420, a control unit 430, and a light emitting unit 440.

The information receiving unit 410 may be connected to another device so as to receive information. In an embodiment, the information receiving unit 410 may include a wired communication module or a wireless communication module, and may include, for example, an RF transmitter/receiver, ZigBee, Bluetooth, a Wi-Fi module, and the like.

The information receiving unit 410 may obtain group information for each performance direction section based on performance direction data preset in audience seat location information (associated with the corresponding cheering lighting device) from a separate server or a separate device.

In an embodiment, the information receiving unit 410 may receive group information mapped onto the audience seat location information for each performance direction section and then may generate group data as shown in Table 2 below.

TABLE 2

| Direction information (e.g., scene information) | 1 | 2 | 3 | 4 | 5 | ... |
|---|---|---|---|---|---|---|
| Group information | A | C | F | G | {15, 15} | ... |

Table 2 shows data of group information for each direction scene for the one specific cheering lighting device 400. The cheering lighting device 400 may belong to group A in a first scene, and thus may be controlled in the same manner as another cheering lighting device belonging to group A. Furthermore, when a scene is switched to a second scene, the cheering lighting device 400 may be controlled in the same manner as another cheering lighting device belonging to group C.

As mentioned above, in a process of recording group information in the cheering lighting device 400 in advance, only information about a group may be stored, and information about the emission state (e.g., color) of group A may not be stored. Accordingly, the control console device 130 may generate emission state information (e.g., color information) with reference to existing performance direction data, may store the emission state information in control data, and may transmit the emission state information to all or some of the cheering lighting devices 400 arranged in a site. For example, in a process of planning pre-directions, it is defined that group A is controlled to emit red light (255, 0, 0) in the first scene. However, control data modified such that group A is controlled to emit green light (0, 255, 0) may be broadcast in consideration of a site atmosphere and an interaction with audiences. At this time, because a plurality of cheering light emitting devices belonging to group A controlled to emit green light are not changed, the seat distribution of a plurality of cheering lighting devices belonging to group A and the outline of the shape or pattern organized by the plurality of cheering lighting devices may be maintained as they are. Only the cheering lighting devices belonging to group A may emit green light.

The storage unit 420 may include a memory, a cache, a buffer, or the like, and may store data received or generated from other components such as the cheering lighting device 400, the master device 120, the control console device 130, or the data processing device 210. In an embodiment, the storage unit 420 may store audience seat location information of the performance hall and group data according to the audience seat location information, which are received by the information receiving unit 410. However, an embodiment is not limited thereto. For example, the storage unit 420 may be connected to a playable video file, or may store performance data of the performance hall 20 and control data according to the performance data, which are received through a physical storage medium.

As described above, the information receiving unit 410 may receive the audience seat location information of the performance hall 20 and the group data according to the audience seat location information from an external device and may store the audience seat location information and the group data in the storage unit 420. However, according to an embodiment, audiences enter performance ticket information through a PC or smart device. The information receiving unit 410 may receive group data mapped onto the entered ticket information through a wired/wireless communication module and may store the group data in the storage unit 420.

Moreover, the storage unit 420 may store a plurality of application programs (or applications) running in the cheering lighting device 400, data for an operation of the cheering lighting device 400, and instructions. At least part of the application programs may be downloaded from an external server through wireless communication.

The control unit 430 may receive the control data from the control console device 130 or the master device 120 or the data processing device 210. At this time, the control unit 430 may selectively receive the control data corresponding to group information of the cheering lighting device 400. In an embodiment, the control unit 430 may selectively extract only the emission state information corresponding to the group information of the cheering lighting device 400 from the control data based on the group data according to the audience seat location information and then may control the light emitting unit 440 to operate depending on the extracted emission state information.

The light emitting unit 440 may include one or more light source elements. The light source element may be, for example, a light emitting diode (LED), or the like. Also, the light emitting unit 440 may output light of various colors according to RGB color information by using a light source element.

Figure 5:
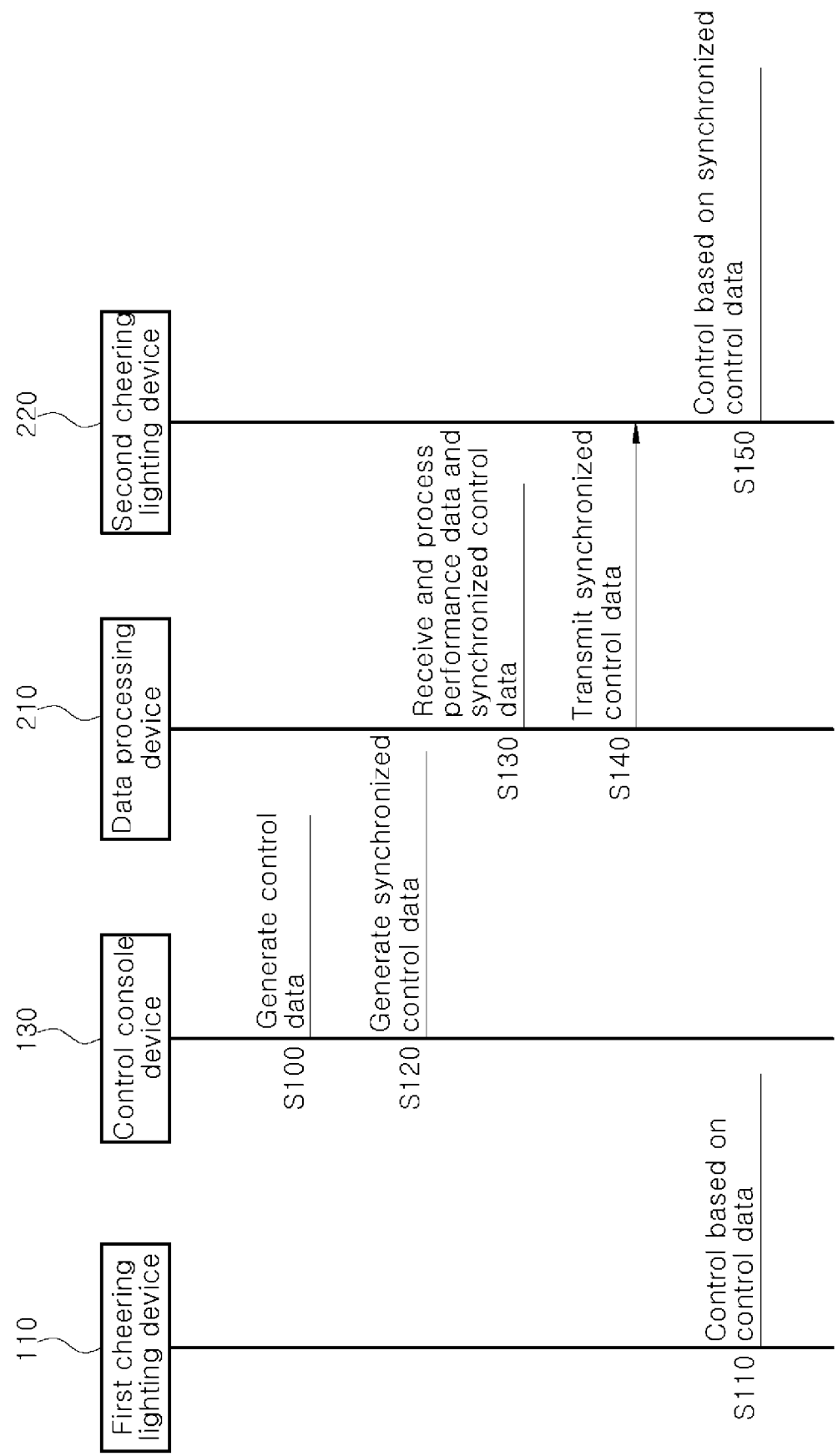
FIG. 5 is a flowchart illustrating a performance directing method for simultaneously controlling a cheering lighting device of audiences by linking a performance hall and a remote place shown in FIG. 2, according to an embodiment of the inventive concept.
Figure 6:
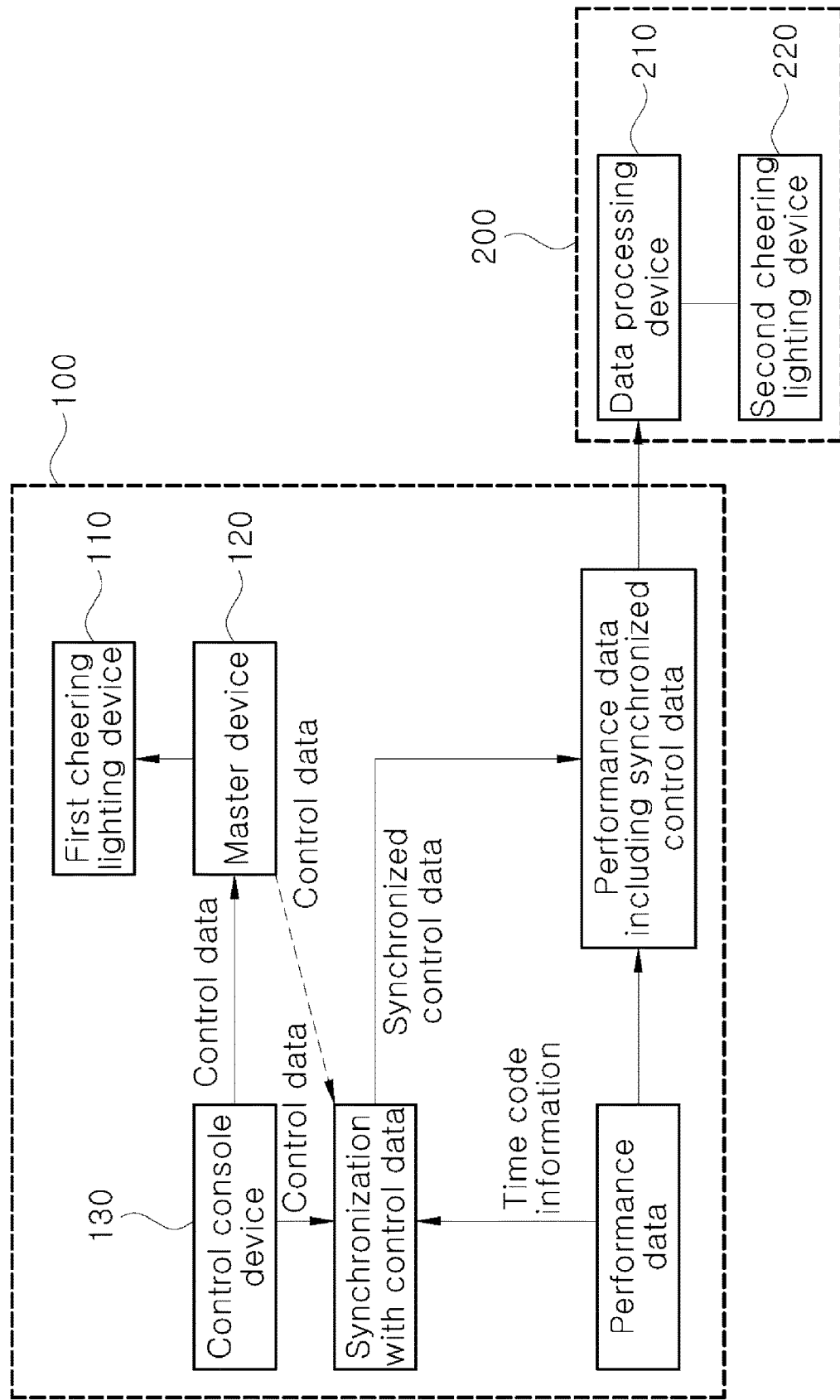
FIG. 6 is a block diagram for describing that synchronized control data is included in performance data, according to an embodiment of the inventive concept.

The operation of the performance directing system 10 for simultaneously controlling cheering lighting devices of audiences by linking a performance hall and a remote place according to an embodiment of the inventive concept having such a structure is as follows. FIG. 5 is a flowchart illustrating a performance directing method for simultaneously controlling a cheering lighting device of audiences by linking a performance hall and a remote place shown in FIG. 2, according to an embodiment of the inventive concept. FIG. 6 is a block diagram for describing that synchronized control data is included in performance data, according to an embodiment of the inventive concept.

First of all, referring to FIG. 5, the control console device 130 may generate control data for controlling the first cheering lighting devices 110 based on performance direction data generated to implement the performance directing effect by using the first cheering lighting devices 110 positioned to correspond to each seat in the performance hall 20 so as to correspond to the performance direction data (S100).

In an embodiment, as the performance is demonstrated in the performance hall 20, the control console device 130 may generate control data corresponding to a performance time based on the performance direction data set to implement each direction scene for each performance direction section.

At this time, the control console device 130 may receive and store the performance direction data from another device (e.g., the above-described data generation device) in advance or may receive the performance direction data through other storage or transmission media. Furthermore, the control console device 130 may receive the performance direction data in real time during performance and may generate control data corresponding to the performance direction data.

Next, the first cheering lighting devices 110 may receive the control data from the control console device 130 or the master device 120. The first cheering lighting devices 110 may selectively receive the control data corresponding to group information, which is pre-stored in the first cheering lighting devices 110, and then may operate depending on an emission state (e.g., emission color) corresponding to the group information based on the received control data (S110).

As mentioned above, the first cheering lighting devices 110 may be positioned to correspond to seats, which are designated through performance tickets, in the performance hall 20 and may receive and store group data including group information mapped onto their seats in advance before the performance is started.

According to an embodiment, the control console device 130 may directly broadcast the control data to the first cheering lighting devices 110 in the performance hall 20 in a wireless communication method and may transmit the control data to the first cheering lighting devices 110 in the performance hall 20 through the master device 120. In this case, as described above, the master device 120 may receive control data generated by the control console device 130 and then may convert the control data received by the master device 120 into a data format determined depending on the communication method. Accordingly, the master device 120 may transmit the converted control data to the first cheering lighting devices 110 depending on a specific communication method (e.g., wireless communication such as RF communication).

Next, the control console device 130 may generate control data synchronized with the performance data (S120). That is, the control console device 130 may provide the control data to the first cheering lighting devices 110 in the performance hall 20 and, at the same time, may control the second cheering lighting devices 220 at the remote place 30 in conjunction with the performance hall 20.

Accordingly, the performance directing effect (i.e., performance direction scene) implemented in the performance hall 20 may be implemented to be synchronized in real time in conjunction with the remote place 30. As such, there is a need for the control console device 130 to control the first cheering lighting devices 110 based on the performance direction data and to provide the control data, which is generated to be implemented in audience seats of the performance hall 20, to the remote place 30 in operation S100.

Furthermore, while watching a performance corresponding to performance data, which is obtained by capturing the performance demonstrated in the performance hall 20 or generated based on the performance, audiences at the remote place 30 may experience the same performance directing effect as those in the performance hall 20. To this end, the audiences at the remote place 30 may experience the performance directing effect according to the performance direction data with the first cheering lighting devices 110 while carrying the second cheering lighting devices 220.

Accordingly, the control console device 130 may process control data based on control data generated to control the first cheering lighting devices 110 such that the first cheering lighting devices 110 are synchronized with the second cheering lighting devices 220.

In an embodiment, the control console device 130 may process the control data generated in operation S100 so as to be synchronized with the performance data to be provided to the remote place 30. At this time, when the control data and the performance data are transmitted to the remote place 30, the control data does not match the performance data due to technical problems during transmission or various problems of the remote place 30, it may be necessary to synchronize and control the control data and the performance data. To solve this issue, time code information may be added to synchronize a playback timing of the control data with a playback timing of the performance data. That is, the control console device 130 may map time code information onto the control data so as to be synchronized with the performance data by using time code information generated based on the performance data or time code information generated based on the performance of the performance hall 20. At this time, the time code information may be information mapped onto the control data synchronized to correspond to a current playback section of the performance data. The time code information may be generated by software, programs, or various devices, such as the master device 120, the control console device 130, the first cheering lighting devices 110, or the server 140 to be described later. The generated time code may be provided to related apparatuses, devices, software, or programs such that all apparatuses and devices in a system may share the same time code information.

For example, the control console device 130 may generate control data synchronized with the performance data by mapping control data so as to correspond to time code information for each frame in the performance data by using time code information generated based on the playback time of performance data.

Alternatively, the control console device 130 may generate control data synchronized with the performance data by mapping the control data so as to correspond to time code information according to a performance time by using the time code information generated based on the start time of the performance of the performance hall 20.

Here, the time code information may be time information generated in units of hours, minutes, seconds, milliseconds, and the like. In the case of an image file, the playback time itself may be used as a time code, or may be generated by using a time code generating device.

For example, the control console device 130 may generate the synchronized control data by mapping a start time point, at which a cheering lighting device performs a specific control operation according to control data, onto time code information based on time code information including time information generated in units of hours, minutes, seconds, milliseconds, or the like.

According to the embodiment, as described above in another device other than the control console device 130 (e.g., a synchronization device), the control data synchronized with the performance data may be generated based on the control data generated to control the first cheering lighting devices 110 so as to be synchronized in conjunction with the second cheering lighting devices 220.

In the meantime, generally, various lighting devices may be directly or indirectly controlled by converting lighting data into a general network signal and transmitting the general network signal to the lighting control console device by using a control protocol such as DMX, ART-NET, ETC-NET, sACN, Shownet, and KiNet, which are supported by lighting control console devices such as GRANDMA, Chamsys, and MADRIX on the performance site. At this time, the control data of the console device converted by using a control protocol has unidirectionality and does not have a feedback. In particular, the control data of the console device may have a structure that does not include a synchronization signal such as a time code.

Accordingly, when the conventional console device is used at the performance site, the second cheering lighting devices 220 at the remote place 30 may not be controlled by using the control data generated to implement the performance directing effect in the performance hall 20, by linking the second cheering lighting devices 220 at the remote place 30 with the first cheering lighting devices 110 in the performance hall 20 at the same time.

However, in the inventive concept, as mentioned above, the control console device 130 may control and synchronize the second cheering lighting devices 220 of the remote place 30 by linking the first cheering lighting devices 110 of the performance hall 20 with the second cheering lighting devices 220 of the remote place 30 through a process of mapping time code information onto control data generated by controlling the first cheering lighting devices 110 of the performance hall 20. Accordingly, when the control console device 130 of the inventive concept is used, the control console device 130 controls the first cheering lighting devices 110 in the performance hall 20 by using the conventional GRANDMA console device as it is and, at the same time, may generate the synchronized control data by mapping time code information onto the control data. Accordingly, the control console device 130 may control the second cheering lighting devices 220 of the remote place 30 together.

Next, the data processing device 210 may receive and identify performance data and control data synchronized with the performance data (S130). That is, the data processing device 210 may receive and process performance data and control data synchronized with the performance data.

In detail, referring to FIG. 6, when the performance data includes the synchronized control data, the data processing device 210 may extract the synchronized control data included in the performance data and may extract control data mapped onto time code information corresponding to a current playback section of the performance data from the extracted synchronized control data. At this time, it is illustrated that the time code information is generated based on the performance data, but is not limited thereto. For example, the time code information may be shared and generated by the master device 120, the control console device 130, or the first cheering lighting devices 110.

In an embodiment, the data processing device 210 may receive and process the performance data and the control data synchronized with the performance data from the performance hall 20 (i.e., the first control system 100) in real time or at regular time intervals.

In another embodiment, the data processing device 210 may receive performance data of the performance hall 20 and control data synchronized with the performance data through a physical storage medium. The audiences at the remote place 30 may be independent of time and place by receiving performance data through physical storage media. In this case, the synchronized control data may be included in the performance data. Alternatively, the control data synchronized with the performance data may be received separately from the performance data.

Next, to implement the performance directing effect at the remote place 30 in conjunction with the performance directing effect implemented in the performance hall 20, the data processing device 210 may provide performance data to audiences at the remote place 30 and then may provide the control data synchronized with the performance data together with the performance data to the second cheering lighting devices 220 through wired and wireless communication (S140). In this case, the data processing device 210 may be a smart device including an image playback function and a remote communication function.

Finally, the second cheering lighting devices 220 may be controlled to correspond to performance direction data based on control data corresponding to a current playback section of a performance image (S150).

In an embodiment, the second cheering lighting devices 220 may selectively receive the control data corresponding to group information pre-stored in the second cheering lighting devices 220 based on the control data corresponding to the current playback section of the performance data and then may operate depending on an emission state (e.g., emission color) corresponding to the group information based on the received control data.

That is, because the second cheering lighting devices 220 receive control data corresponding to the performance data at the time of a current playback, the second cheering lighting devices 220 may operate in synchronization with a performance directing effect (i.e., performance direction data) directed by the first cheering lighting devices 110 in the performance data. Accordingly, audiences at the remote place 30 may receive the same performance and performance directing effect as those to be experienced in the performance hall 20.

The second cheering lighting devices 220 may be connected to the data processing device 210 so as to receive performance data and the synchronized control data through Bluetooth, Wi-Fi, a wired connection, a dongle device, or the like. Alternatively, the second cheering lighting devices 220 may also receive the performance data and the synchronized control data through another separate device (e.g., a separate server) or a separate transmission medium.

Figure 7:
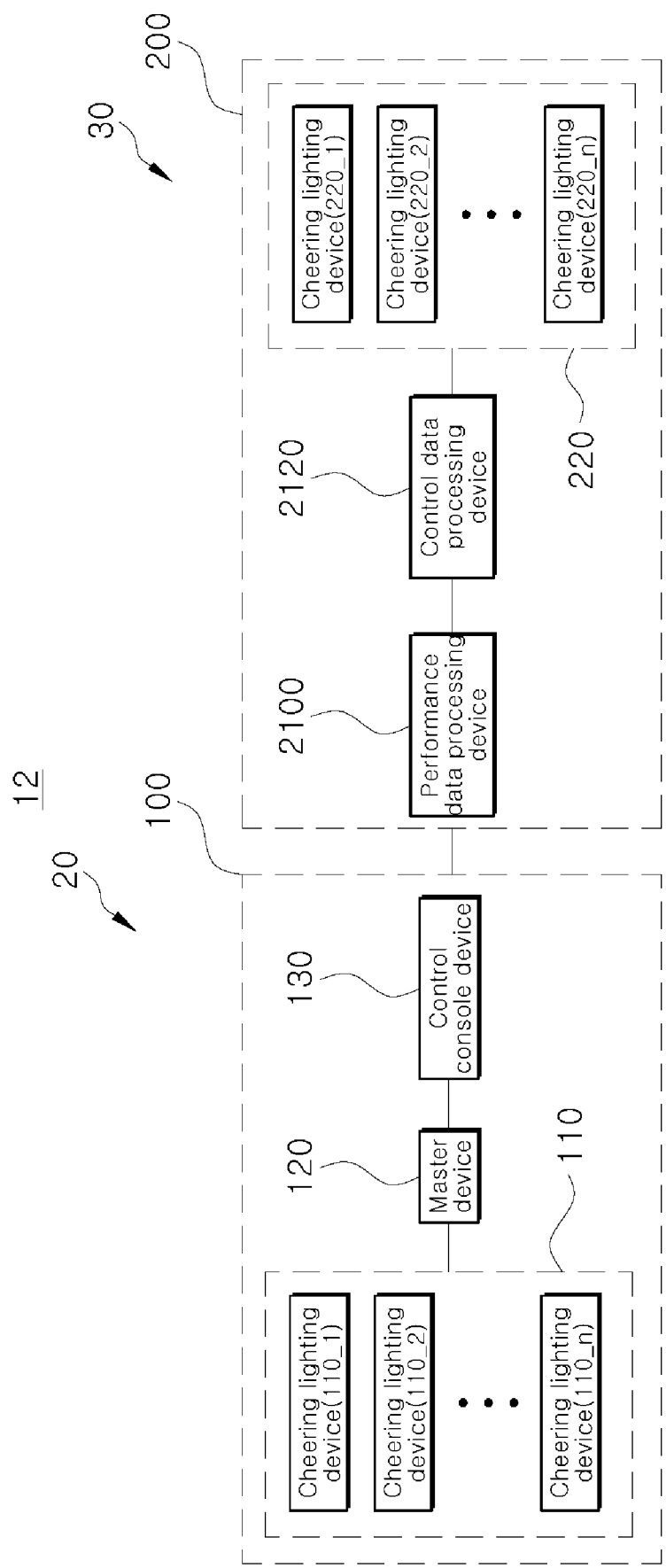
FIG. 7 is a block diagram schematically illustrating a configuration of a performance directing system that simultaneously controls cheering lighting devices of audiences by linking a performance hall and a remote place, according to another embodiment of the inventive concept.

FIG. 7 is a block diagram schematically illustrating a configuration of a performance directing system 12 that simultaneously controls cheering lighting devices of audiences by linking a performance hall and a remote place, according to another embodiment of the inventive concept.

Referring to FIG. 7, according to another embodiment of the inventive concept, the performance directing system 12 may include a performance data processing device 2100 for processing performance data and a control data processing device 2120 for controlling the second cheering lighting devices 220 based on control data.

Except for the performance data processing device 2100 and the control data processing device 2120 shown in FIG. 7, the performance directing system 12 may have the same properties as the performance directing system 10 illustrated in FIG. 2.

Hereinafter, descriptions identical to the descriptions given with reference to FIG. 2 will be omitted to avoid redundancy, and different points may be mainly described. Accordingly, components performing the same function as the performance directing system 12 shown in FIG. 7 are marked by the same reference signs as illustrated in FIG. 2, and thus, additional description will be omitted to avoid redundancy.

The performance data processing device 2100 may receive and process performance data. That is, the performance data processing device 2100 may provide the performance data, which is one of a video, an audio, an image, and a text, to audiences at the remote place 30.

The control data processing device 2120 may receive and process performance data and synchronized control data and may provide the processed result to the second cheering lighting devices 220. That is, the control data processing device 2120 may analyze and identify the control data and may transmit the control data to the second cheering lighting devices 220 of the audiences at the remote place 30 in a wired/wireless communication method such that the second cheering lighting devices 220 are controlled. At this time, the control data processing device 2120 may analyze and identify the control data by using an application program (or an application) and may transmit the control data to the second cheering lighting devices 220 of the audiences at the remote place 30 in a wired/wireless communication method such that the second cheering lighting devices 220 are controlled. The application program (or application) may be downloaded through an external server or the performance-hall-side control system 100 through wireless communication.

In the meantime, when the performance data and the control data synchronized with performance data are provided through the data processing device 210 shown in FIG. 2 while the performance data is not separated from the control data synchronized with performance data, the performance data processing device 2100 may process the performance data, and the control data processing device 2120 may separate and process the performance data and the control data synchronized with performance data.

In an embodiment, after receiving the performance data and the control data synchronized with the performance data, the performance data processing device 2100 may separate the performance data and the control data, may process the performance data, and may transmit the control data to the control data processing device 2120.

In an embodiment, the performance data processing device 2100 may be a playback device including a beam projector, a monitor, a TV, and the like.

In an embodiment, the control data processing device 2120 may be a device including a remote communication function.

Figure 8:
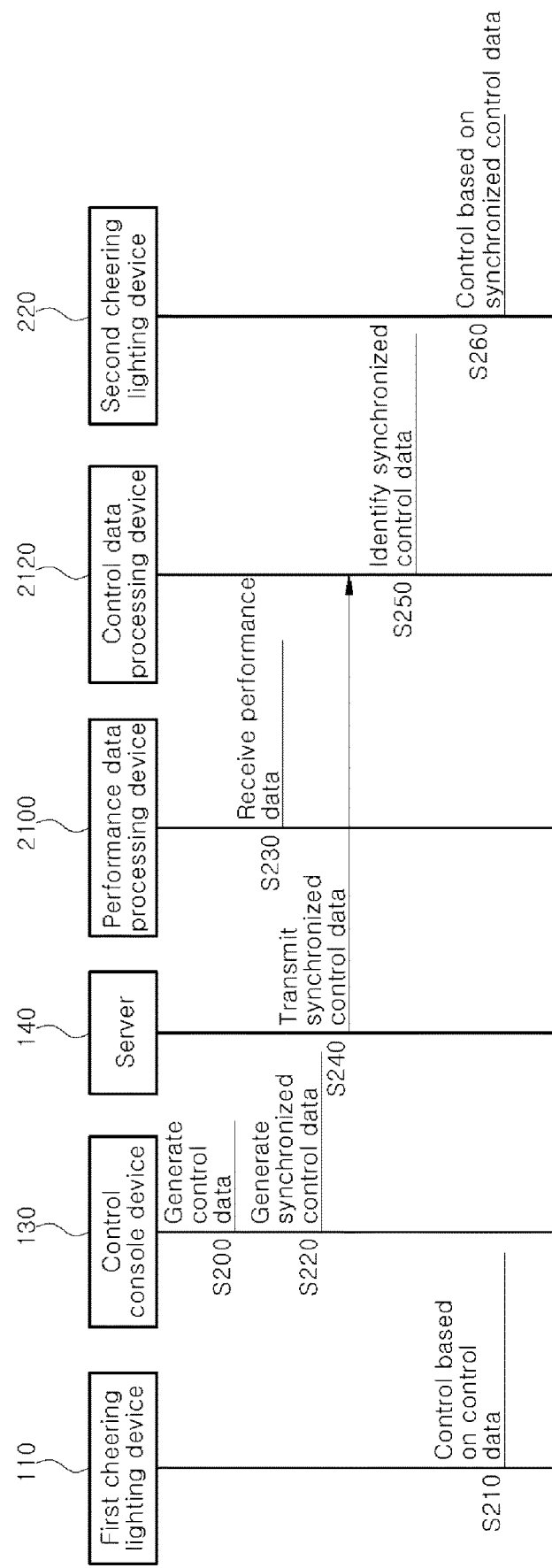
FIG. 8 is a flowchart illustrating a performance directing method for simultaneously controlling a cheering lighting device of audiences by linking a performance hall and a remote place shown in FIG. 7, according to another embodiment of the inventive concept.
Figure 9:
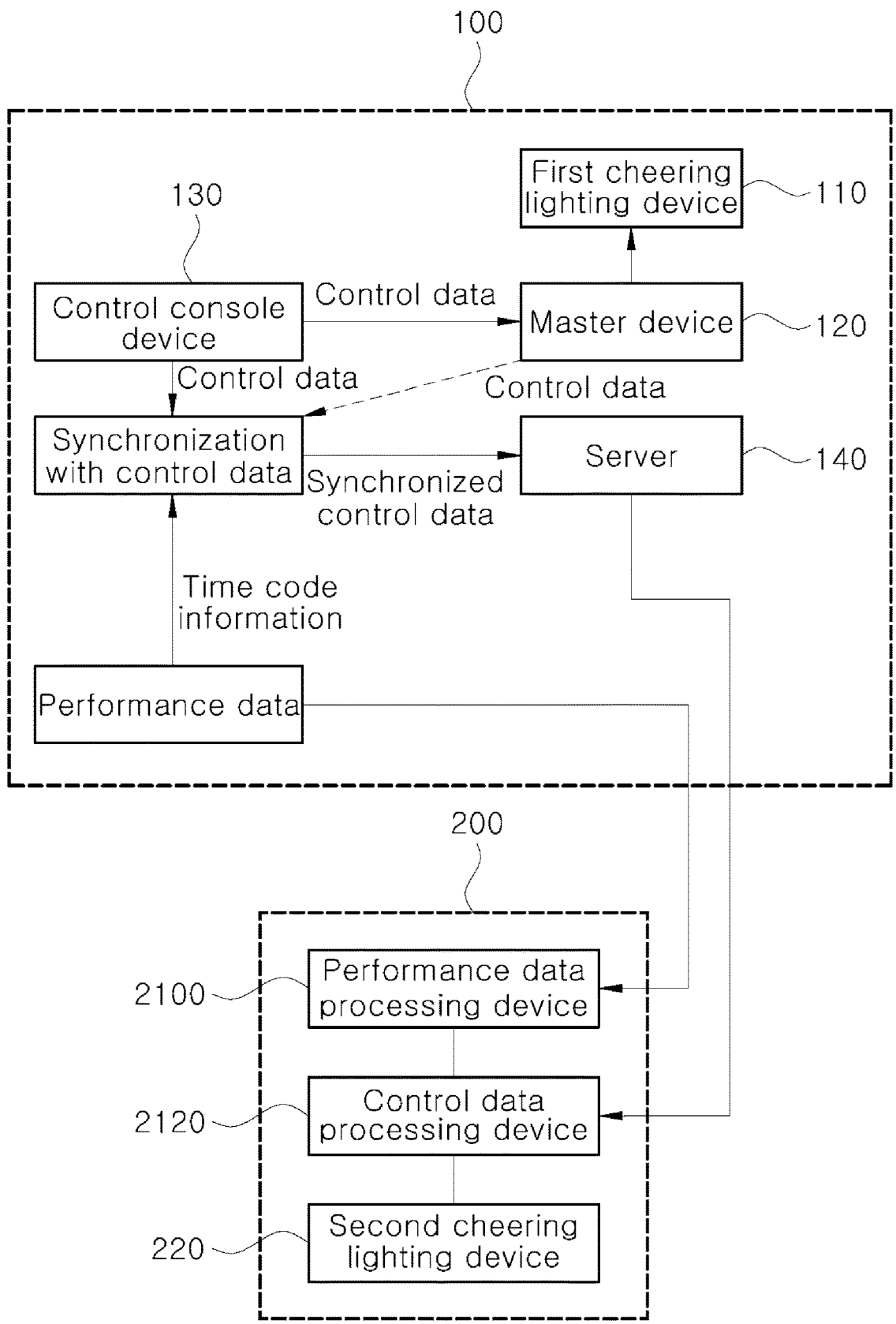
FIG. 9 is a block diagram for describing that performance data and synchronized control data are separately provided, according to another embodiment of the inventive concept.

The operation of the performance directing system 12 for simultaneously controlling cheering lighting devices of audiences by linking a performance hall and a remote place according to another embodiment of the inventive concept having such a structure is as follows. FIG. 8 is a flowchart illustrating a performance directing method for simultaneously controlling a cheering lighting device of audiences by linking a performance hall and a remote place shown in FIG. 7, according to another embodiment of the inventive concept. FIG. 9 is a block diagram for describing that performance data and synchronized control data are separately provided, according to another embodiment of the inventive concept.

In this embodiment, a case that performance data and synchronized control data are separately provided will be described. As such, operation S200 is the same as operation S100 illustrated in FIG. 5; operation S210 is the same as operation S110 illustrated in FIG. 5; and, operation S220 is the same as operation S120 illustrated in FIG. 5. Accordingly, additional description will be omitted to avoid redundancy.

First of all, referring to FIGS. 8 and 9, when the performance data does not include the synchronized control data, the performance data processing device 2100 may receive performance data generated based on the performance demonstrated in the performance hall 20 (S230). At this time, the performance data may be received from the performance hall 20 (i.e., the first control system 100) in real time or at regular intervals, or may be received through a physical storage medium.

Next, when the performance data does not include the synchronized control data, the server 140 may transmit the synchronized control data received from the control console device 130 to the control data processing device 2120 (S240).

In the meantime, in an embodiment, operation S240 may be performed before or simultaneously with operation S230.

Next, the control data processing device 2120 may identify the synchronized control data received from the server 140 (S250).

In detail, the control data processing device 2120 may obtain control data generated to correspond to the performance data from the server 140 and may extract control data mapped onto time code information corresponding to a current playback section of the performance data from the obtained control data. At this time, it is illustrated that time code information is generated based on the performance data, but is not limited thereto. For example, the time code information may be shared and generated by the master device 120, the control console device 130, the first cheering lighting devices 110, or the server 140.

Finally, the second cheering lighting devices 220 may be controlled to correspond to performance direction data based on the control data corresponding to a current playback section of the performance data (S260).

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, it is possible to identically implement and provide performance directing effects on audience seats of a performance hall to audiences at a remote place. Accordingly, audiences at the remote place may have the same experience as watching a performance at an actual performance site.

According to an embodiment of the inventive concept, not only cheering lighting devices in the performance hall but also cheering lighting devices at the remote place may be synchronized and controlled in real time by using a control console device used in the performance hall.

According to an embodiment of the inventive concept, the cheering lighting devices at the remote place may be synchronized by using control data generated to control the cheering lighting devices in the performance hall.

According to an embodiment of the inventive concept, audiences at remote places may have the same experience as watching a performance in a performance hall, regardless of time/location by providing the performance data of the performance hall to the audiences at the remote place by using physical storage media.

According to an embodiment of the inventive concept, in the case where there is a playback delay when a video or audio is played, a cheering lighting device may be controlled depending on performance data by synchronizing the performance data with the cheering lighting device to match the performance data with the cheering lighting device by using time code information. Accordingly, the immersion of audiences may be maximized.

According to an embodiment of the inventive concept, while playback errors or playback delays that may occur during the playback of performance data are prevented, the cheering lighting device may be controlled as a smart device simultaneously controls performance data and control data synchronized with the performance data.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A performance directing system for controlling at least one cheering lighting device by linking a performance hall and a remote place, the system comprising:
   a control console device configured to generate control data for controlling at least one first cheering lighting device in response to performance direction data based on the performance direction data generated to implement a performance directing effect by using the first cheering lighting device positioned to correspond to each seat in the performance hall;
   a data processing device configured to provide performance data generated based on a performance demonstrated in the performance hall to at least one audience in the remote place to implement a performance directing effect at the remote place in conjunction with the performance directing effect implemented in the performance hall and to separately process the performance data and the control data synchronized with the performance data; and
   an at least one second cheering lighting device of the at least one audience controlled to correspond to the performance direction data based on the control data corresponding to a current playback section of the performance data,
   wherein the remote place includes a private space related to the at least one audience.

2. The system of claim 1, wherein the data processing device includes:
   a performance data processing device configured to receive and process the performance data; and
   a control data processing device configured to receive and process the control data.

3. The system of claim 1, wherein the second cheering lighting device is controlled based on the control data the same as the first cheering lighting device.

4. The system of claim 1, wherein the second cheering lighting device corresponds to virtual seats virtually generated in the performance hall and are controlled based on the control data.

5. The system of claim 2, wherein the control data synchronized with the performance data is configured by mapping time code information onto the control data so as to be synchronized with the performance data by using the time code information.

6. The system of claim 5, wherein the control data processing device extracts control data mapped onto time code information corresponding to a current playback section of the performance data from the control data synchronized with the performance data and provides the second cheering lighting device with the extracted control data.

7. The system of claim 1, wherein the control data is generated such that the control console device controls the first cheering lighting device in response to the performance direction data.

8. The system of claim 2, further comprising:
a server configured to receive the control data from the console device and to transmit the control data to the control data processing device.

9. The system of claim 1, further comprising:
a master device configured to:
receive the control data from the control console device;
convert the control data into a wireless signal; and
transmit the wireless signal to the first cheering lighting device in the performance hall through wireless communication.

10. The system of claim 1, wherein the performance data is one of a video, an audio, an image, and a text.

11. The system of claim 1, wherein the performance data and the control data are provided by using a physical storage medium.

12. A method of controlling a performance directing system that controls at least one cheering lighting device by linking a performance hall and a remote place, the method comprising:
generating, by a control console device of the performance directing system, control data for controlling at least one first cheering lighting device in response to performance directing data based on the performance directing data generated to implement a performance directing effect by using the first cheering lighting device positioned at each seat in the performance hall; and
providing, by a data processing device of the performance directing system, performance data generated based on a performance demonstrated in the performance hall to at least one audience in the remote place to implement a performance directing effect at the remote place in conjunction with the performance directing effect implemented in the performance hall and separately processing the performance data and the control data synchronized with the performance data,
wherein at least one second cheering lighting device of the at least one audience of the performance directing system are controlled to correspond to the performance direction data based on the control data corresponding to a current playback section of the performance data, and
wherein the remote place includes a private space related to the at least one audience.

13. The system of claim 12, wherein the second cheering lighting device is controlled based on the control data the same as the first cheering lighting device.

14. The system of claim 12, wherein the second cheering lighting device corresponds to virtual seats virtually generated in the performance hall and are controlled based on the control data.

15. The system of claim 12, wherein the control data synchronized with the performance data is configured by mapping time code information onto the control data so as to be synchronized with the performance data by using the time code information, and
wherein a control data processing device extracts control data mapped onto time code information corresponding to a current playback section of the performance data from the control data synchronized with the performance data and provides the second cheering lighting device with the extracted control data.

16. The system of claim 12, wherein the control data is generated such that the control console device controls the first cheering lighting device in response to the performance direction data.

17. The system of claim 15, further comprising:
receiving, by a server of the performance directing system, the control data from the console device and transmitting the control data to the control data processing device.

18. The system of claim 12, further comprising:
receiving, by a master of the performance directing system, the control data from the control console device;
converting, by the master of the performance directing system, the control data into a wireless signal; and
transmitting, by the master of the performance directing system, the wireless signal to the first cheering lighting device in the performance hall through wireless communication.

19. The system of claim 12, wherein the performance data is one of a video, an audio, an image, and a text.

20. The system of claim 12, wherein the performance data and the control data are provided by using a physical storage medium.

* * * * *